No. 849,132. PATENTED APR. 2, 1907.
C. H. HOOK.
ADJUSTABLE PIPE HANGER.
APPLICATION FILED JULY 3, 1906.
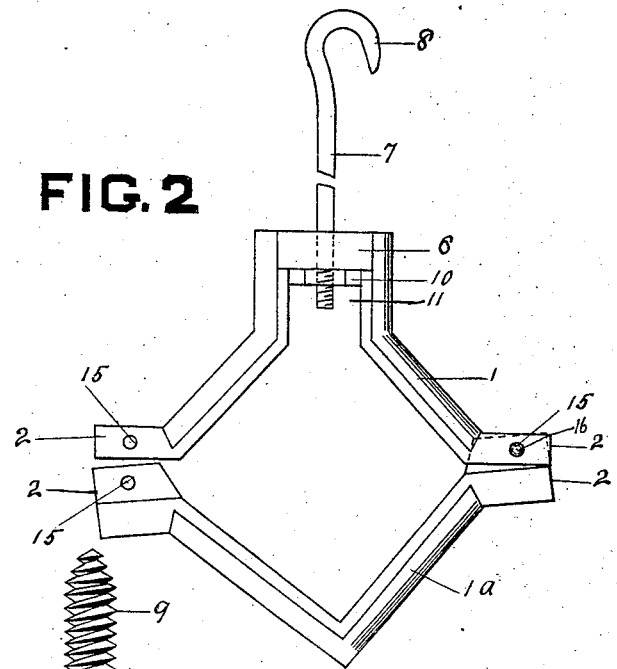
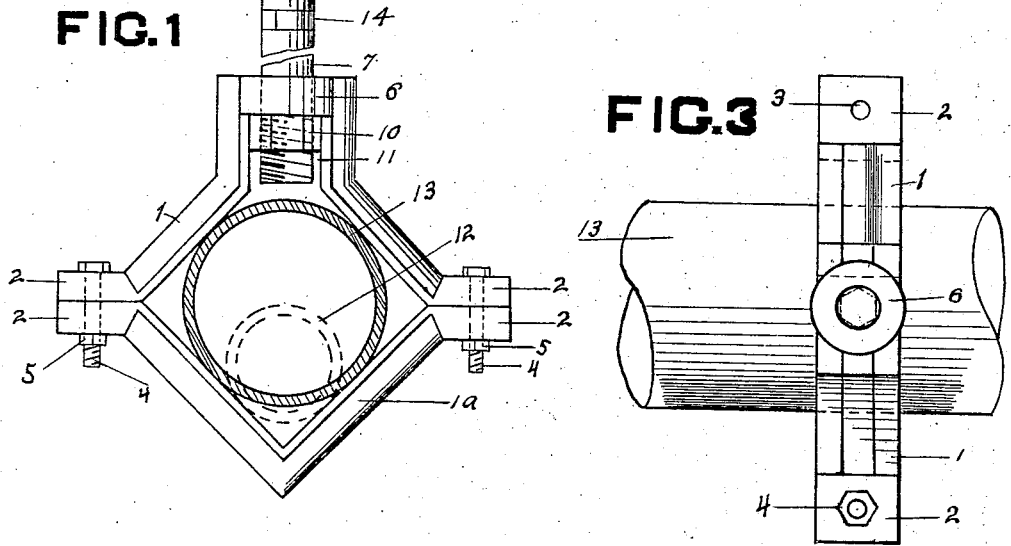
WITNESSES:
R. P. McClelland.
Harry Hosick.
C. Howard Hook INVENTOR.
BY Audley Livingston
ATTORNEY.

UNITED STATES PATENT OFFICE.

CHARLES HOWARD HOOK, OF PITTSBURG, PENNSYLVANIA.

ADJUSTABLE PIPE-HANGER.

No. 849,132.  Specification of Letters Patent.  Patented April 2, 1907.

Application filed July 3, 1906. Serial No. 324,655.

*To all whom it may concern:*

Be it known that I, CHARLES HOWARD HOOK, a citizen of the United States, residing at Pittsburg, in the county of Allegheny and State of Pennsylvania, have invented certain new and useful Improvements in Adjustable Pipe-Hangers, of which the following is a specification.

My invention relates to pipe-hangers, and has for its object the providing of a pipe-hanger which will be adapted interchangeably to use with several sizes of pipe, so that only a few stock sizes of hanger will be required for the many sizes of pipe in general use.

Another object of my invention is to permit facility of operation, as well as quick and accurate alinement of the pipe, and, further, to permit free expansion of the pipe without undue restriction from the hanger, all of which functions I combine in a neat-appearing and compact hanger.

In the accompanying drawings, which form part of this specification, Figure 1 is a view of my improved hanger in connection with pipes of various diameters and shows one form of connection between the complementary yokes. Fig. 2 shows another form of the hanger as applied to a pipe and shows a convenient method of connecting the yokes, so as to permit rapid and easy insertion of the pipe. Fig. 3 is a view of the hanger from above and a section of the pipe as shown in Fig. 1.

Referring again to the drawings, the right-angular yoke-pieces 1 and 1ª have lugs 2 2 at their extremities, with bolt-holes 3 therein, and in the form shown in Fig. 1, bolts 4 with nuts 5, connecting opposed lugs.

In the form shown in Fig. 2 the lugs 2 2 are designed to intermesh and are provided with pin-holes 15 and pins 16, one of which pins is removable, so that the lower yoke may swing downward to admit the pipe. Yoke-piece 1 has an offset 6 bored to receive the hanger-rod 7, provided either with a hook end 8, as in Fig. 2, or with a screw end 9, as in Fig. 1. A nut 10 is seated in the recess 11, which provides room for the projecting screw end of the hanger-rod without interference with the pipe. 12 represents a section of pipe of comparatively small diameter, and 13 shows a section of pipe of larger diameter.

In the form of hanger-rod shown in Fig. 1—*i. e.*, one having a lag-screw point—I show a right and left hand thread on opposite ends of the hanger-rod, so that by this means adjustment may be had, the nut 10 being held firmly from turning in its seat in the recess 11 and the hexagonal face at the point 14 being provided for convenient use of a wrench in making said adjustment. The wide range of sizes of pipe which any one size of pipe-hanger of this improved type will take is apparent from an inspection of the drawings, and it is therefore apparent that only a very few sizes of hanger of this type are required in connection with the full line of standard pipe sizes.

My device is particularly adaptable to steam-pipes or similar pipes in which there is considerable expansion and contraction. The pipe touches the hanger only at two points on the lower yoke, the yoke-arms being substantially tangential to the circumference of the pipe, thereby permitting free expansion of the pipe, and when the hanger-rod shown in Fig. 2 is used additional free movement in the pipe is permitted by the hook and eye at the end of said hanger-rod.

Having thus described my invention, I claim as new and desire to protect by Letters Patent of the United States—

1. In an adjustable pipe-hanger, the combination of two complementary substantially L-shaped yokes having lugs at their extremities, bolts passing through and connecting opposed lugs, and a threaded hanger-rod passing through the apex of one of said L-shaped yokes and having an adjusting-nut, substantially as described.

2. In an adjustable pipe-hanger, the combination of a right-angular yoke having lugs at its extremities, a complementary yoke with similar lugs, means for detachably connecting the two yokes, a recessed offset in the apex of one of said yokes, and a threaded hanger-rod passing through said recessed offset and having a nut seated in said recess, substantially as and for the purpose set forth.

3. In an adjustable pipe-hanger, the combination of two complementary right-angular-shaped yokes, an offset at the apex of one of said yokes and having a recessed nut-seat in the inner side thereof, a hanger-rod passing through said offset and having an adjusting-nut located in said seat, and means for connecting said yokes, substantially as and for the purpose set forth.

In testimony whereof I have affixed my signature in presence of two witnesses.

C. HOWARD HOOK.

Witnesses:
   JOHN T. AYRES,
   C. LUDLOW LIVINGSTON.